Figure 2:
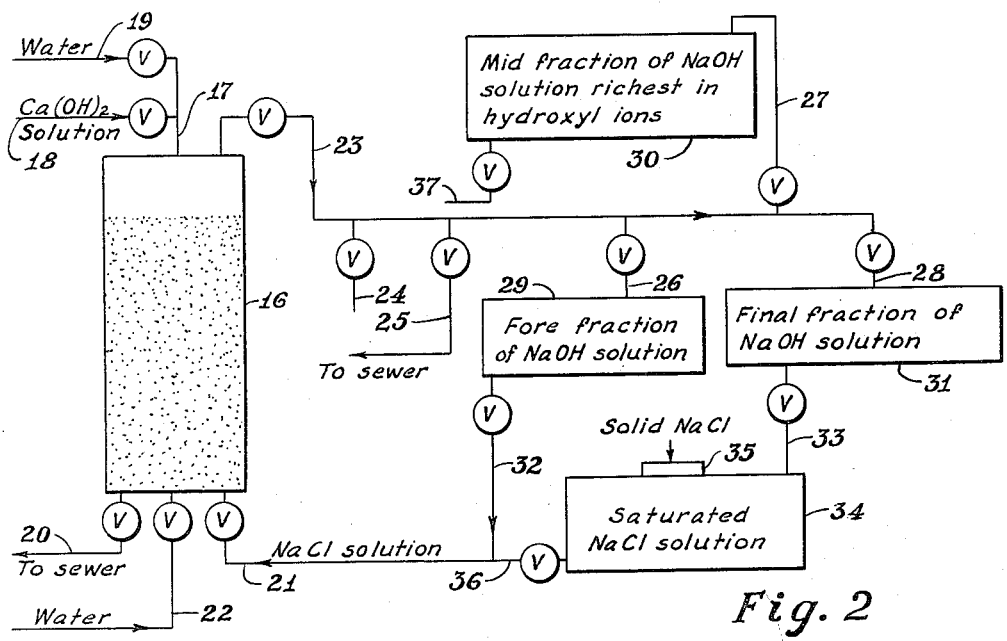

Aug. 5, 1952 W. C. BAUMAN 2,606,098
PRODUCTION OF ALKALI METAL HYDROXIDES BY EXCHANGE OF IONS
Filed Dec. 29, 1948 2 SHEETS—SHEET 1

INVENTOR.
William C. Bauman
BY
Griswold & Burdick
ATTORNEYS

Patented Aug. 5, 1952

2,606,098

UNITED STATES PATENT OFFICE 2,606,098

PRODUCTION OF ALKALI METAL HYDROXIDES BY EXCHANGE OF IONS

William C. Bauman, Midland, Mich., assignor to The Dow Chemical Company, Midland, Mich., a corporation of Delaware Application December 29, 1948, Serial No. 68,036

13 Claims. (Cl. 23—184)

1

This invention concerns an improved method for making alkali metal hydroxides by exchange of ions, employing strongly basic anion exchange resins containing quaternary ammonium radicals. It relates more particularly to a method of making alkali metal hydroxides from aqueous solutions of lime and alkali metal halides by use of strongly basic anion exchange resins that are quarternary ammonium bases or salts thereof.

In the water softening art it is common practice to remove alkaline earth metal ions from the water by passing the same through a bed of an alkali metal form of a cation exchange agent. During such treatment the alkali metal ions of the cation exchange agent are displaced by alkaline earth metal ions in the water so that the water is depleted of alkaline earth metal ions and is enriched in alkali metal ions. When the cation exchange agent has absorbed its capacity of alkaline earth metal ions, it is treated with an aqueous solution of sodium chloride or other alkali metal salt to effect displacement of the alkaline earth metal ions and regenerate the cation exchange agent to its alkali metal form. It may then be re-employed in the process.

The procedure just described may be employed to prepare a dilute aqueous solution of sodium hydroxide from lime and sodium chloride by passing an aqueous solution of lime, i. e. calcium hydroxide, through a bed of a cation exchange agent in sodium form to absorb the calcium ions and introduce sodium ions into the solution. The sodium hydroxide solution thus obtained is of weak concentration, usually of 0.2 per cent by weight or less because of the low solubility of calcium hydroxide in water. For most uses, it is, in general, necessary to concentrate the solution by evaporation, e. g. by heating the solution in a vacuum.

I have found that salts of strongly basic anion exchange resins containing quaternary ammonium groups may advantageously be used to absorb hydroxyl ions from dilute aqueous solutions containing the same and that the hydroxyl ions thus absorbed may thereafter be displaced from the anion exchange resin by concentrated aqueous alkali metal halide solutions and recovered in much higher concentration as aqueous solutions of alkali metal hydroxides. The relatively concentrated alkali metal hydroxide solution thus prepared may be used directly or it may be evaporated to recover the alkali metal hydroxide in solid form.

I have further found that the strongly basic anion exchange agents containing quaternary

2 ammonium chloride groups can be used to absorb hydroxyl ions from aqueous solutions of alkaline earth metal hydroxides, e. g. calcium hydroxide, and the hydroxyl ions thus absorbed, displaced by halogen ions from a concentrated aqueous solution of an alkali metal halide and recovered as an aqueous solution containing 5 per cent by weight or more of alkali metal hydroxide.

The invention provides a method for the production of alkali metal hydroxides from readily available and cheap raw materials, e. g. lime and salt. The method may also be employed to concentrate weak, e. g. from 0.1 to 3 per cent by weight, aqueous solutions of alkali such as sodium or potassium hydroxide and so avoid a large part of the evaporation that would be required in order to recover the solid alkali by direct evaporation of the dilute solution. The method may be used to prepare aqueous solutions of alkali metal hydroxides from salts of different alkali metals. For instance, the chloride of a strongly basic anion exchange resin may be converted to the hydroxide form by washing with a dilute aqueous solution of sodium hydroxide and then treated with a saturated aqueous solution of potassium chloride to obtain a more concentrated potassium hydroxide solution.

Insofar as I am aware, the use of a strongly basic anion exchange agent containing quaternary ammonium chloride groups to collect hydroxyl ions from aqueous solutions of sparingly soluble alkaline earth metal hydroxides, e. g. calcium hydroxide or barium hydroxide, has not heretofore been known, and its utility for this purpose could not well have been foreseen. In this connection, it will be noted that in the usual employment of an anion exchange agent for softening water, there is alternate absorption of the acids by the basic form of the anion exchange agent and displacement of the absorbed acids by treatment of the agent with an aqueous solution of ammonia or an alkali metal hydroxide. The reaction involved is reversible and the direction in which it proceeds is dependent upon the pH of the aqueous solution. In general, the usual anion exchange agents containing amino groups, such as the condensation products of aromatic amines and formaldehyde, absorb acids most readily from aqueous solutions having a pH of 5 or lower. The anion exchange resins containing amino groups are ineffective to absorb anions of salts of acids from neutral or alkaline aqueous solutions. Accordingly, the anion exchange resins to be employed in practice of this invention should be strongly basic, capable of splitting salts of alkali metal halides in aqueous alkali solution, by absorption of halide ions on the resin with displacement of hydroxyl ions from the anion exchange resin into the solution. To be satisfactory for such purpose in the present process, the anion exchange agent containing quaternary ammonium hydroxide groups should be capable of absorbing halogen ions from aqueous solutions of alkali metal halides of 10 per cent concentration or higher, advantageously of greater than 15 per cent concentration, to form a concentrated alkali metal hydroxide solution of from 5 to 15 per cent by weight or more.

Both the rate and the direction of the reversible reaction involved in the displacement of hydroxyl ions from a strong basic anion exchange agent containing quaternary ammonium hydroxide groups by halogen ions of an alkali metal salt or vice versa, are dependent not only upon the relative proportions of the halogen ions and hydroxyl ions in each phase of the reaction mixture but upon their actual concentrations in each of these phases and upon the selectivity of the anion exchange resin for hydroxyl or halogen ions. The equilibrium conditions of the reversible reaction involved may be represented by the equation:

$$\frac{X_R^-}{OH_R^-} = K \frac{X_S^-}{OH_S^-}$$

wherein $X_S^-$ and $OH_S^-$ represent the respective concentrations, e. g. in gram atomic weights per liter, of halogen and hydroxyl ions in the solution contacted with the anion exchange resin, $X_R^-$ and $OH_R^-$ represent the respective concentrations of halogen and hydroxyl ions, e. g. as gram atomic weights per unit volume of the anion exchange resin, chemically combined with the resin and K is a constant. The optimum conditions are obtained when K has a value equal to one, i. e. when the anion exchange resin has equal selectivity for hydroxyl ions and halogen ions. In general, an anion exchange resin that has a value for the selectivity constant K of from 0.5 to 10 is satisfactory.

I have also noted that in the step of liberating the hydroxyl ions from the strongly basic anion exchange resin, e. g. by flow of an aqueous sodium chloride solution over the same, the concentration of the hydroxyl ions as alkali metal hydroxide in the first portions of liquor flowing from the anion exchange resin is low, but that as the flow continues the concentration of alkali metal hydroxide increases to a maximum value and then drops off. The concentration of alkali metal halide in the effluent liquor gradually increases to a maximum value of substantially the same concentration as the feed solution employed to displace the hydroxyl ions from the anion exchange resin. The effluent liquor thus generated may advantageously be divided into portions as it flows from the anion exchange resin, the midportion which is richest in alkali metal hydroxide, and preferably with a low concentration of alkali metal halide, being reserved for evaporation or other treatment to recover the alkali metal hydroxide therefrom, and the portions poorest in alkali metal hydroxide being treated with an additional amount of solid alkali metal halide to increase the concentration of halide ions therein and being used for the further treatment of the anion exchange resin to liberate hydroxyl ions from the latter and form alkali metal hydroxide. By this procedure, the amount of hydroxyl ions recovered as alkali metal hydroxide in concentrated aqueous solution with a minimum concentration of alkali metal halide impurity may be increased and the amount of alkali metal halide which need be added as such may be reduced.

Figure 1:
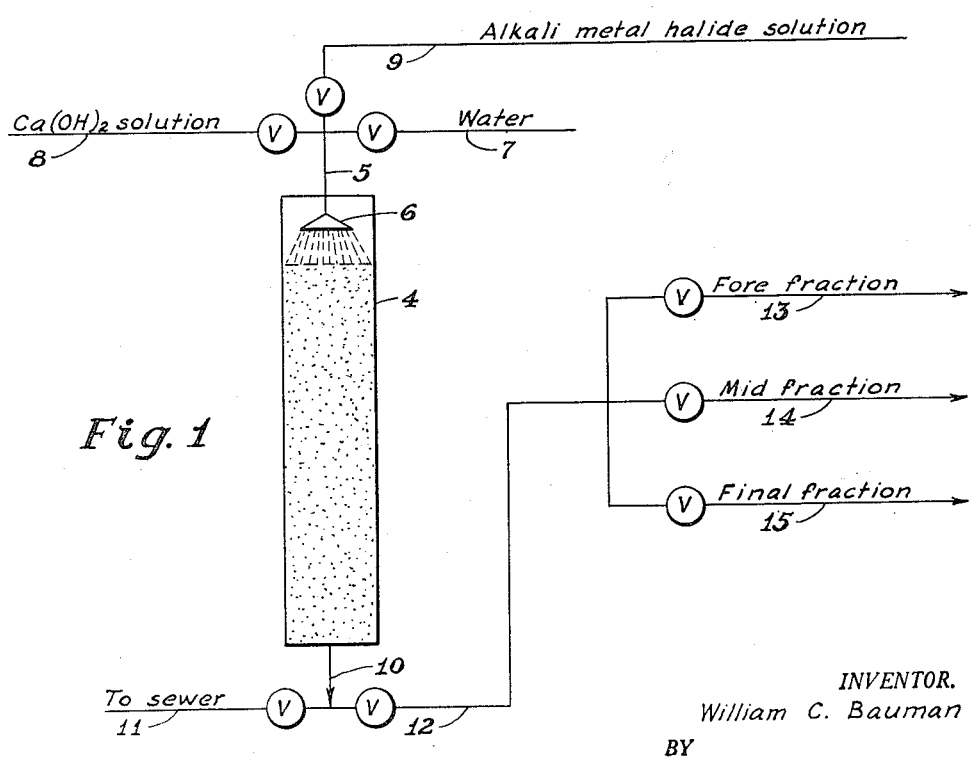
Figure 3:
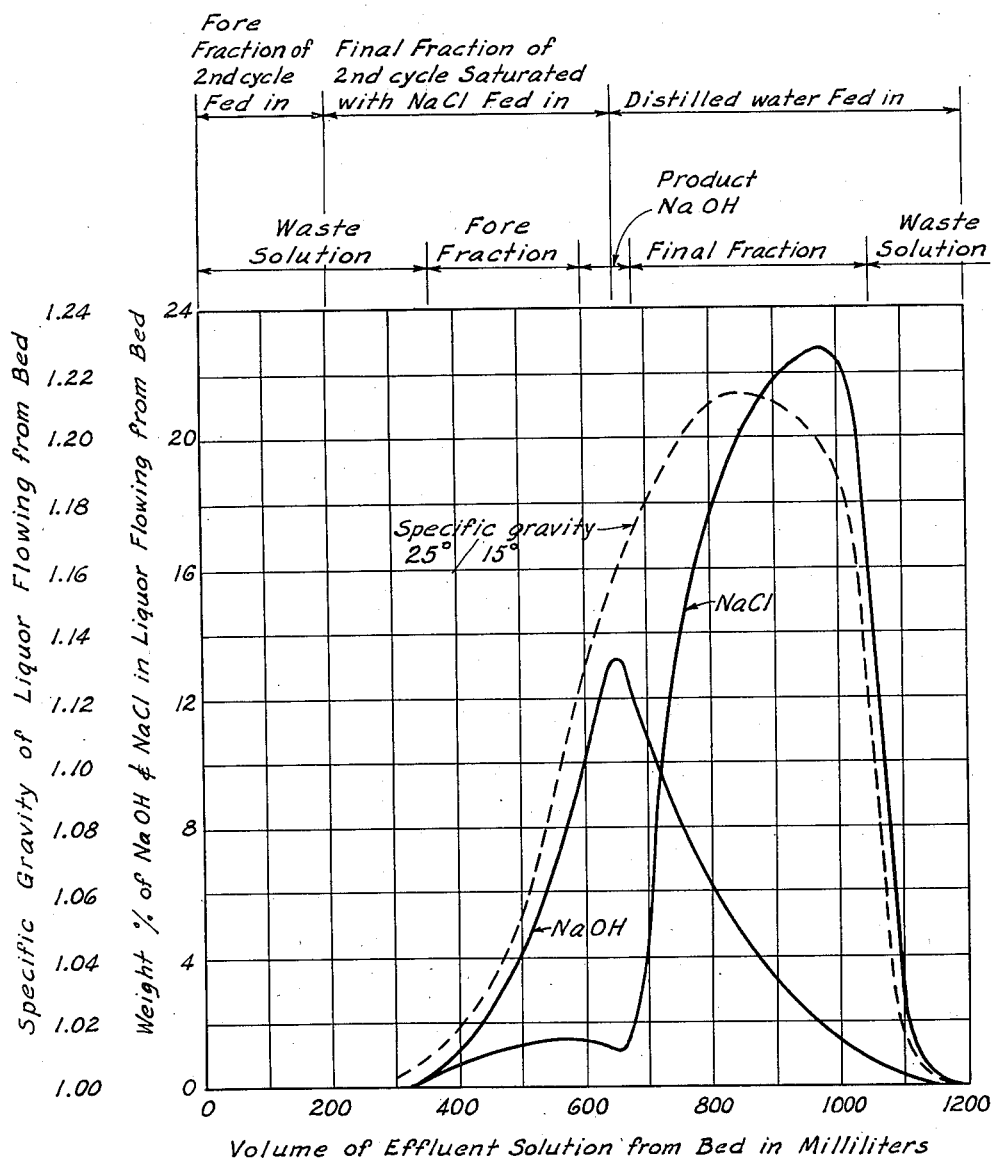

In the accompanying drawings, Figs. 1 and 2 are diagrammatic sketches showing certain of the various forms and arrangements of apparatus which may be used in practicing the invention. Fig. 3 is a graph showing the results actually obtained in practice of the invention as described in Example 3 cycle 3, hereinafter presented, using apparatus similar to that illustrated in Fig. 1.

In Fig. 1 the numeral 4 designates a reaction chamber which is filled with a water-insoluble strongly basic anion exchange resin containing quaternary ammonium chloride groups, i. e. in its neutral or sodium chloride regenerated form, as indicated and is provided near its top with an inlet 5, which inlet terminates in a distributor head 6, situated inside of the chamber. Valved conduits 7, 8 and 9 are connected to the inlet 5 so as to alternately pass water, calcium hydroxide solution and alkali metal halide solution through the bed of resin in any desired order. A conduit 10, leading from the bottom of the chamber 4, branches into the valved lines 11 and 12 which serve as outlets for the spent calcium hydroxide solution and alkali metal hydroxide solution, respectively. Outlet 12 feeds into the valved conduits 13, 14 and 15 which serve as outlets for withdrawing the alkali metal hydroxide solution to storage in separate fractions of different concentration. In Fig. 2 of the drawings, the numeral 16 designates a reaction chamber which is filled with a bed of a chloride form of a granular strongly basic anion exchange resin containing quaternary ammonium radicals as indicated and is provided near its top with an inlet 17. Valved conduits 18 and 19 are connected to the inlet 17. A valved conduit 20 leading from the bottom of chamber 16 serves as an outlet for withdrawing liquor to waste. Leading to the lower end of chamber 16 are valved conduits 21 and 22. A valved conduit 23 near the top of chamber 16 provides an outlet for flow of effluent liquor from the resin bed. Conduit 23 is connected to a valved line 24 for withdrawing samples of the effluent liquor, a valved line 25 leading to a sewer and valved conduits 26, 27 and 28 leading to storage vessels 29, 30 and 31, respectively. Storage vessel 29 is connected by valved conduit 32 to conduit 21 leading to chamber 16. A valved conduit 33 connects storage vessel 31 with vessel 34 which vessel is provided with an opening 35 and a valved outlet 36 connected to conduit 21 leading to chamber 16. Storage vessel 30 is provided with a valved outlet 37 for withdrawing liquor therefrom.

It will be understood that the apparatus shown in Figs. 1 and 2 may be modified or other forms of apparatus may be used in practice of the invention. For instance, in place of the single chamber apparatus of Figs. 1 and 2 a multiple chamber apparatus having any desired number of reaction chambers may be employed.

Any of the strongly basic anion exchange resins containing quaternary ammonium groups which, when added in hydroxide form to a 1 normal aqueous sodium chloride solution brings the latter to a pH value of 10 or above, may be used in the process. In general, water-insoluble anion exchange resins which are quaternary ammonium bases are satisfactory. However, such anion exchange agents vary widely as regards the convenience and economy with which they may be employed. To be best suited to the purpose, the anion exchange agent in its hydroxide form should have a basicity substantially equivalent to the basicity of the alkali metal hydroxide being formed. It should have a high absorption capacity for hydroxyl ions, should swell or shrink only moderately or not at all during use, it should be one from which a large proportion of the absorbed hydroxyl ions may rapidly and economically be displaced by halogen ions from an aqueous solution of an alkali metal halide and vice versa, i. e. it should have substantially equal selectivity for halogen ions and hydroxyl ions.

A number of water-insoluble anion exchange resins suitable for use in the process are described in a co-pending application Serial No. 68,035 of myself and another, filed concurrently herewith.

In brief, an anion exchange resin that is a quaternary ammonium base or a salt thereof, may be prepared by reacting a halomethylating agent such as chloromethyl methyl ether or bromomethyl methyl ether with the normally solid benzene-insoluble copolymers of monovinyl-aromatic compounds, e. g. styrene, ar-methylstyrene, ar-chlorostyrene, ar-dimethylstyrene, vinyl-naphthalene, ar-methylvinylnaphthalene, etc., and a polyvinyl-aromatic compound such as divinylbenzene, ar-divinyltoluene, ar-divinylxylene, divinylnaphthalene, ar-divinylethylbenzene, etc., which copolymers may contain from 0.5 to 20 per cent by weight of the polyvinyl-aromatic compound chemically combined, i. e. interpolymerized, with the monovinyl-aromatic compounds. Thereafter the halomethylated vinyl-aromatic resin is reacted with a tertiary amine, preferably a tertiary mono- or di-alkyl N-substituted alkanol or alkanediol amine, e. g. to form a quaternary ammonium halide. Examples of such tertiary amines are dimethylethanolamine, methyldiethanolamine, dimethylisopropanolamine, methyldiisopropanolamine and 1-dimethylamino-2,3-propanediol.

The halomethylating reaction may be carried out at room temperature or above in the presence of a halomethylating catalyst, e. g. zinc chloride, zinc oxide, stannic chloride, aluminum chloride, tin, zinc, iron, etc., while the copolymer is swollen by, or dispersed in an organic liquid, such as an excess of the halomethylating agent, that is less reactive with the halomethylating agent than is the polymer. The quaternizing reaction, i. e. the reaction of the halomethylated vinyl-aromatic resin with the tertiary amine is usually carried out by dispersing the solid granular halomethylated vinyl-aromatic resin and tertiary amine in a liquid such as water, acetone, or ethyl alcohol, and maintaining the mixture at temperatures of from 25° to 100° C. over a period of 4 hours or longer. The resin is thereafter washed with water, preferably washed with an organic liquid such as acetone, ethanol, or dioxane, etc., and then with water to remove any soluble components, e. g. unreacted tertiary amine.

In practicing the invention with apparatus such as that shown in Fig. 1 of the drawings, aqueous calcium hydroxide solution is passed through a bed of the strongly basic anion exchange resin in its neutral or sodium chloride regenerated form until the hydroxyl ion content of the water flowing from the resin bed is nearly the same as the feed. After the anion exchange resin has absorbed its capacity of hydroxyl ions, the flow of calcium hydroxide solution is discontinued and water is passed through the bed to rinse the resin free of calcium hydroxide solution. An aqueous alkali metal halide, e. g. sodium chloride, solution of 10 per cent concentration or higher is passed through the resin bed to cause chemical displacement of the hydroxyl ions from the anion exchange resin by the halogen ions of the alkali metal halide with formation of alkali metal hydroxide solution containing the hydroxyl ions in higher concentration than in the calcium hydroxide solution. After the anion exchange agent is depleted of hydroxyl ions, the resin bed is rinsed with water to wash the residual concentrated alkali metal halide solution from the anion exchange resin. The anion exchange agent is then reemployed to absorb hydroxyl ions by treating it with an aqueous calcium hydroxide solution. The reaction is usually carried out at room temperature or thereabout, although other temperatures may be employed.

The concentration of hydroxyl ions as alkali metal hydroxide in the effluent solution flowing from the resin bed increases as the concentration of the alkali metal halide solution used to displace the hydroxyl ions is increased. Accordingly, I usually employ an aqueous alkali metal halide solution of 15 per cent concentration or higher, preferably a saturated solution, which in the case of sodium chloride is about 26 per cent concentration, to displace the hydroxyl ions. Another important factor which influences the concentration of the hydroxyl ions in the effluent liquor is the extent to which the alkali metal halide solution becomes mixed with, and diluted by, the rinse water, used to wash the calcium hydroxide solution from the resin bed, during travel through the bed of anion exchange resin. In this connection, it may be mentioned that following regeneration of the anion exchange resin to its hydroxide form by treatment with calcium hydroxide solution and washing of the resin with water to remove free calcium hydroxide solution, the resin is, of course, saturated with water. The amount of water thus retained in the anion exchange resin may be sufficient to cause considerable dilution of the concentrated alkali metal halide solution used to displace the hydroxyl ions, if it becomes mixed therewith. Also, a greater volume of concentrated alkali metal halide solution may be required to displace the hydroxyl ions from the anion exchange resin so that it may be more economical to flush the water from the resin bed with a dilute aqueous alkali metal halide solution, followed by the concentrated alkali metal halide solution and discard the first portion of effluent liquor flowing from the resin bed.

Because of dilution by the rinse or wash water present in the anion exchange agent, the first portions of the effluent liquor may contain hydroxyl ions as alkali metal hydroxide in undesirably low concentration, but the concentration of alkali metal hydroxide increases as the flow is continued until it reaches a maximum value, after which it gradually decreases due to depletion of the hydroxyl ions which had been absorbed in the anion exchange resin. The concentration of alkali metal halide is also low in the first portions of effluent liquor flowing from the anion exchange resin but increases as the flow continues until it reaches a maximum substantially the same as the concentration of the alkali metal halide solution entering the resin bed. Subsequent rinsing of the anion exchange resin with water to remove the concentrated alkali metal halide solution retained therein, prior to converting the resin to its hydroxide form by treatment with an aqueous calcium hydroxide solution, produces an effluent liquor in which the concentration of alkali metal halide ions gradually decreases. Accordingly, the mid-portion of the effluent liquor is richest in alkali metal hydroxide and it is desirable that this portion be collected separately from those which precede and follow it. The first effluent liquor flowing from the anion exchange resin during the cycle, which liquor has an undesirably low concentration of hydroxyl ions is discarded as waste. As the flow continues and the concentration of hydroxyl ions increases the effluent is collected separately in a series of two or more portions, herein called a fore fraction, the mid-portion richest in alkali metal hydroxide is collected as a separate fraction and the final effluent is collected in one or more portions. The anion exchange resin is then rinsed with water to remove the concentrated alkali metal halide solution retained therein. In a preferred mode of operation, the fore fraction is collected in a series of portions of increasing alkali metal hydroxide content, the mid-portion richest in hydroxyl ions is collected separately, and the final portion of effluent liquor flowing from the resin, including that obtained during rinsing with water to remove the concentrated alkali metal halide solution retained in the resin, is collected in a series of fractions of decreasing alkali metal halide content. The very first and last portions of effluent liquor, undesirably low in alkali metal hydroxide and alkali metal halide concentration are discarded. The remaining portions of the fore fraction and final fraction are maintained separate. The separate portions of the fore fraction are treated wtih solid alkali metal halide to increase the concentration of the latter to above 15 per cent and preferably above 20 per cent. Usually, the portion of lowest alkali metal hydroxide concentration is enriched with alkali metal halide to form an at least 15 per cent alkali metal halide solution and the remaining portions of the fore fraction further enriched with alkali metal halide so as to form solutions of gradually increasing alkali metal halide concentration until a nearly saturated aqueous alkali metal halide solution is obtained. The separate portions of the enriched fore fraction are then fed successively into contact with the anion exchange resin, when starting the next cycle, in the order of their concentration beginning with the most dilute portion so that the rinse water retained in the resin is flushed therefrom by the solution of lowest concentration and is followed by solutions of increasing concentration until a solution saturated with alkali metal halide is entering the resin bed. The portions of the final fraction of effluent liquor are separately treated with solid alkali metal halide to form a concentrated and nearly saturated aqueous solution of alkali metal halide and again employed to displace hydroxyl ions from the anion exchange resin. After treatment with the saturated alkali metal halide solution and washing with water the anion exchange resin is, of course, reemployed to absorb a further quantity of hydroxyl ions, e. g. from an aqueous calcium hydroxide solution, and the cycle repeated.

The procedure in practicing the invention with the apparatus shown in Fig. 2 of the drawings is similar to that described with reference to Fig. 1, except that provision is made for rinsing or washing the resin bed with either upflow or downflow of water, as desired and also for carrying out the displacement of hydroxyl ions from the anion exchange agent by flow of the alkali metal halide solution through the bed in a direction counter-current to the flow of the calcium hydroxide solution through the bed when absorbing hydroxyl ions, so as to obtain an increased efficiency in displacing the hydroxyl ions from the anion exchange resin.

The graph shown in Fig. 3 is almost self-explanatory. It shows the specific gravity and the concentration of sodium hydroxide and sodium chloride, expressed as per cent by weight, in the effluent solution flowing from the anion exchange resin during that portion of the third cycle of operations as described in Example 3, wherein the anion exchange resin after absorbing its capacity of hydroxyl ions from the aqueous calcium hydroxide solution and being rinsed with water, is then treated successively with the fore fraction from the second cycle of operations and with the final fraction from the second cycle, which fraction has been enriched with solid sodium chloride so as to form a nearly saturated aqueous sodium chloride solution to displace the hydroxyl ions from the resin and form sodium hydroxide and this is followed by a water wash to flush the concentrated sodium chloride solution from the resin bed.

The process as hereinbefore described may be modified in any number of ways. For instance, instead of using an aqueous solution of calcium hydroxide to supply hydroxyl ions, solutions of other alkaline earth metal hydroxides may be used, e. g. barium hydroxide or strontium hydroxide. Dilute aqueous solutions of alkali metal hydroxides, e. g. of from 0.1 to 3 weight per cent concentration, may also be used to regenerate the anion exchange resin to its hydroxide form. The process may be employed to absorb hydroxyl ions from aqueous solutions such as waste liquor from pulp and paper industries containing low concentrations of the same and recover the hydroxyl ions as alkali metal hydroxide in more concentrated aqueous solution. The ion exchange method herein disclosed permits the production from lime and an alkali metal halide, of aqueous solutions of the corresponding alkali metal hydroxides of 5 per cent concentrations or more.

The following examples illustrate practice of the invention, but are not to be construed as limiting the scope thereof.

EXAMPLE 1

A granular strongly basic anion exchange resin, containing quaternary ammonium chloride groups was placed in a glass tube having an internal diameter of 1.7 inches to form a resin bed 66 inches deep. The anion exchange resin consisted of the reaction product of dimethylethanolamine with a chloromethylated copolymer of 85 parts by weight styrene, 9 parts ethylvinylbenzene and 6 parts divinylbenzene. The anion exchange resin was in its neutral or sodium chloride regenerated form. It had an anion exchange capacity equivalent to 15,000 grains of calcium carbonate per cubic foot of resin bed. An aqueous saturated solution of calcium hydroxide was passed downflow through the resin bed at an average rate of 40 cc. of solution per minute until the concentration of hydroxyl ions in the solution flowing from the resin was substantially the same as that of the solution entering the bed. The resin was rinsed free of calcium hydroxide solution by washing with distilled water. A saturated sodium chloride solution was then passed through the resin bed at a rate of 40 cc. of solution per minute to effect displacement of the absorbed hydroxyl ions. The effluent liquor was collected in a series of fractions each of 50 cc. volume and titrated for sodium hydroxide and sodium chloride. Table I identifies the successive 50 cc. fractions of effluent solution obtained, beginning with fraction 6, (samples 1 to 5 being discarded), by stating the per cent by weight of sodium hydroxide and also the per cent of sodium chloride in each.

*Table 1*

[Effluent Solution.]

| Fraction No. | Percent NaOH | Percent NaCl |
| --- | --- | --- |
| 6 | 0 | 0.03 |
| 7 | 1.08 | 0.26 |
| 8 | 2.88 | 0.59 |
| 9 | 5.12 | 0.91 |
| 10 | 7.25 | 1.09 |
| 11 | 8.25 | 1.32 |
| 12 | 5.52 | 5.07 |
| 13 | 2.90 | 13.45 |
| 14 | | 24.80 |

EXAMPLE 2

A granular anion exchange resin, containing quaternary ammonium chloride groups was placed in a one inch internal diameter glass tube to form a resin bed 32.5 inches deep. The anion exchange resin consisted of the reaction product of dimethylisopropanolamine with a chloromethylated copolymer of 85 parts by weight styrene, 9 parts ethylvinylbenzene and 6 parts divinylbenzene. The anion exchange resin was in its neutral or sodium chloride regenerated form, and had an anion exchange capacity equivalent to 26,000 grains of calcium carbonate per cubic foot of resin bed. An aqueous 0.041 normal calcium hydroxide solution was passed downflow through the resin bed at a rate of about 100 cc. of solution per minute until a total of 25 liters of calcium hydroxide solution was fed into the resin bed. This was followed by 1000 cc. of distilled water to rinse the calcium hydroxide solution from the resin bed. A saturated sodium chloride solution was then passed downflow through the bed of anion exchange agent at a rate of 10 cc. of solution per minute until a total of 400 cc. of sodium chloride was fed into contact with the anion exchange resin. This was followed by 450 cc. of distilled water, fed to the reaction chamber at a rate of 40 cc. per minute. The effluent liquor flowing from the resin was collected in a series of fractions each of 50 cc. volume and analyzed for sodium hydroxide and sodium chloride. A peak concentration of 7.92 per cent by weight sodium hydroxide solution, containing 1.59 per cent sodium chloride was obtained in the 50 cc. portion of solution collected between 200 and 250 cc. flow of effluent liquor from the resin.

EXAMPLE 3

A purpose of this example is to show the results obtained during practice of the invention in a cyclic manner. Another purpose is to illustrate the advantages of collecting the sodium hydroxide solution, which also contains sodium chloride, as a series of successive fractions during its flow from a strongly basic anion exchange resin and of replenishing the fore and final fractions, i. e. those containing sodium hydroxide in lower concentration than the mid-fractions, with sodium chloride, to form a concentrated solution of the latter and employing the resultant solution in a subsequent cycle of the process to displace hydroxyl ions from the anion exchange resin and the consequent formation of an additional amount of sodium hydroxide. The anion exchange resin employed was the reaction product of dimethylethanolamine and a chloromethylated copolymer of 85 parts by weight styrene, 9 parts ethylvinylbenzene and 6 parts divinylbenzene. The anion exchange resin was in its neutral or sodium chloride regenerated form, i. e. it contained quaternary ammonium chloride groups. The resin consisted of granules passing through a 20 mesh per inch standard Tyler screen and retained on a 42 mesh screen and it had an anion exchange capacity equivalent to 23,400 grains of calcium carbonate per cubic foot of resin bed. The anion exchange resin was placed in a glass tube having an internal diameter of one inch, to form a bed of resin 44 inches deep. The first cycle of operation involved passing an aqueous 0.041 normal calcium hydroxide solution downflow through the resin bed at an average rate of 40 cc. of solution per minute until the concentration of hydroxyl ions and chloride ions in the liquor flowing from the resin was substantially the same, then discontinuing the feed of calcium hydroxide solution, rinsing from the resin the calcium hydroxide solution retained therein, by washing downflow with 400 cc. of distilled water, introducing 400 cc. of an aqueous saturated sodium chloride solution at a rate of about 10 cc. per minute and thereafter passing about 600 cc. of distilled water into the resin bed to displace the solution containing sodium chloride from the bed. The effluent solution was collected as a series of fractions, each of 50 cc. volume and analyzed for sodium hydroxide and sodium chloride. A total of 19 fractions was collected. A peak concentration of 8.60 per cent by weight sodium hydroxide solution containing 3.31 per cent sodium chloride was obtained in the fraction collected between 400 and 450 cc. flow of effluent liquor from the resin. The first 300 cc. and final 100 cc. of effluent liquor were of undesirably low sodium hydroxide concentration and were discarded. Fractions 9–17, including the fraction of peak sodium hydroxide concentration, were maintained separate and treated with sufficient solid sodium chloride to form a concentrated and nearly saturated sodium chloride solution. In the second cycle of the process, the calcium hydroxide solution was again passed through the bed of anion exchange resin until the latter had absorbed its capacity of hydroxyl ions and the calcium hydroxide solution retained by the resin bed was washed therefrom with water. The fractions of sodium hydroxide solution collected and saved in the first cycle of operations, including fractions 7 and 8 and fractions 9–17 which were saturated with sodium chloride, were then fed, in the order in which they had been collected, at a rate of 10 cc. per minute, downflow through the bed of anion exchange resin for the purpose of displacing absorbed hydroxyl ions, thereby enriching the liquor in sodium hydroxide and the concentrated solution rinsed from the resin by introducing 500 cc. of distilled water. The effluent liquor flowing from the resin was again collected as a series of fractions, each of 50 cc. volume and analyzed for sodium hydroxide and sodium chloride as in the first cycle. A series of 21 fractions was collected. A peak concentration of 10.70 per cent sodium hydroxide solution, containing 3.20 per cent sodium chloride, was obtained in the fraction collected between 500 and 550 cc. flow of effluent liquor from the resin. Fractions 1-6 and 20-21 were of undesirably low sodium hydroxide concentration and were discarded. Fractions 7, 8, 9 and 10 were maintained as collected. Fractions 11-19 were treated with solid sodium chloride to form a concentrated nearly saturated sodium chloride solution and the fractions so collected employed in carrying out another cycle of operations. The cycle of operations was continued, without reserving any of the mid-fractions, to establish a condition of balance between the aqueous sodium chloride solution which was fed to the anion exchange agent in a given cycle and the concentration of sodium hydroxide and sodium chloride in the effluent liquor. Each successive cycle was carried out in the same way as the second cycle just described. After the sixth cycle a mid-fraction of the effluent solution flowing from the anion exchange resin contained a maximum concentration of 16.8 per cent by weight of sodium hydroxide and 1.08 per cent sodium chloride. Thereafter the operating conditions were the same as those in the preceding cycle. Table II identifies the successive 50 cc. fractions of effluent solution obtained in cycle 8 of the process, beginning with fraction 6 (fractions 1 to 5 were discarded), by stating the per cent by weight of sodium hydroxide and also the per cent of sodium chloride in each.

*Table II*
[Effluent Solution.]

| Fraction No. | Percent NaOH | Percent NaCl |
| --- | --- | --- |
| 6 | 0.02 | 0.0 |
| 7 | 0.28 | 0.17 |
| 8 | 0.91 | 0.46 |
| 9 | 1.64 | 0.86 |
| 10 | 2.51 | 0.90 |
| 11 | 3.40 | 1.01 |
| 12 | 4.34 | 0.99 |
| 13 | 5.53 | 1.09 |
| 14 | 7.07 | 1.13 |
| 15 | 9.22 | 1.10 |
| 16 | 11.3 | 0.98 |
| 17 | 14.1 | 0.95 |
| 18 | 16.6 | 0.83 |
| 19 | 16.7 | 2.66 |
| 20 | 14.3 | 8.37 |
| 21 | 11.7 | 13.3 |
| 22 | 9.43 | 16.7 |
| 23 | 7.66 | 18.5 |
| 24 | 6.17 | 20.0 |
| 25 | 4.91 | 21.4 |
| 26 | 3.74 | 21.9 |
| 27 | 2.65 | 21.9 |
| 28 | 1.44 | 17.7 |
| 29 | 0.28 | 4.14 |
| 30 | 0.04 | 0.41 |

The mid-fraction consisting of one-half of fraction 18 and one-half of fraction 19 was reserved for evaporation or other treatment to recover sodium hydroxide therefrom in more concentrated solution. Fractions 6, 7, 28, 29 and 30 were discarded. The remaining portions of fractions 18 and 19 and fractions 20-27 were separately treated with sufficient solid sodium chloride to form a concentrated or nearly saturated sodium chloride solution and employed in the next succeeding cycle of operations. Fractions 8-17, inclusive, were used without further treatment in the next cycle of operations. After the anion exchange resin had again become saturated with hydroxyl ions by passage of calcium hydroxide solution over the same, the feed of calcium hydroxide solution was discontinued and the anion exchange resin was rinsed with water. Fractions 8-17 above, were then fed consecutively to the bed of anion exchange resin in the order in which they were collected and followed in order by the remaining portions of fractions 18 and 19 and by fractions 20 to 27 which had been saturated with sodium chloride. After all of the above fractions had been fed into the bed, 100 cc. of a saturated sodium chloride solution was introduced for the purpose of completing the regeneration reaction and 400 cc. of distilled water was then passed into the bed to rinse the concentrated sodium chloride solution therefrom. The fractions of sodium hydroxide solution collected were practically the same as those identified in Table II. The 50 cc. fraction containing the maximum concentration of sodium hydroxide was reserved and added to the similar fraction collected from the preceding cycle. Similar fractions containing a maximum concentration of sodium hydroxide were reserved from cycles 10 and 11. The fractions containing the maximum concentration of sodium hydroxide from cycles 8-11, inclusive, were combined and concentrated by heating the liquid to a temperature of 92° C. at 3.5 inches of mercury absolute pressure. The concentrated solution was cooled to room temperature and filtered. The resulting solution contained 48.13 per cent by weight sodium hydroxide and 0.93 per cent sodium chloride. Other impurities were 0.03 per cent $Na_2SO_4$, 0.14 per cent $Na_2CO_3$, 0.05 per cent $SiO_2$ and a trace of iron (Fe).

In practical operation of the process, it is apparent from the results just given that an aqueous solution containing about 10 per cent by weight or more of sodium hydroxide could be withdrawn during the cycle and such solution employed directly for many applications or economically concentrated by evaporation or by evaporation or by other usual procedure to produce solid sodium hydroxide or a concentrated aqueous solution of the same.

Other modes of applying the principle of the invention may be employed instead of those explained, change being made as regards the methods herein disclosed, provided the step or steps stated by any of the following claims or the equivalent of such stated step or steps be employed.

I claim:

1. A method of making an alkali metal hydroxide which comprises, treating a water-insoluble strongly basic anion exchange resin containing quaternary ammonium hydroxide radicals, each of which quaternary ammonium hydroxide radicals has its hydroxyl group attached to the nitrogen atom thereof, with a stream of an aqueous solution of an alkali metal halide of at least 10 per cent concentration to effect displacement of the hydroxyl ions with formation of alkali metal hydroxide solution containing the alkali metal hydroxide in concentration of at least 5 per cent by weight.

2. A method of making an alkali metal hydroxide from calcium hydroxide and an alkali metal halide by exchange of ions which comprises, passing an aqueous solution of calcium hydroxide into contact with a halide of a water-insoluble strongly basic anion exchange resin composed of the reaction product of a vinyl-aromatic resin having halomethyl radicals attached to its aromatic nuclei and a tertiary amine selected from the group consisting of the tertiary monoalkyl and dialkyl N-substituted alkanolamines, to absorb hydroxyl ions and thereafter treating the anion exchange resin with a stream of an aqueous solution of an alkali metal halide of at least 10 per cent concentration to effect displacement of the absorbed hydroxyl ions with formation of alkali metal hydroxide solution containing the alkali metal hydroxide in concentration of at least 5 per cent by weight.

3. A method of making sodium hydroxide from calcium hydroxide and sodium chloride by exchange of ions which comprises, passing an aqueous calcium hydroxide solution into contact with a water-insoluble anion exchange resin containing quaternary ammonium chloride groups, said anion exchange resin consisting of the reaction product of a vinyl-aromatic resin having halomethyl radicals attached to its aromatic nuclei and a tertiary amine selected from the group consisting of the tertiary mono- and di-alkyl N-substituted alkanolamines, to absorb hydroxyl ions, and thereafter treating the anion exchange resin with a stream of an aqueous solution of sodium chloride of at least 10 per cent concentration to effect displacement of the absorbed hydroxyl ions with formation of sodium hydroxide solution containing sodium hydroxide in concentration of at least 5 per cent by weight.

4. A process as claimed in claim 3 wherein the anion exchange resin consists of the reaction product of a chloromethylated copolymer of from 0.5 to 20 parts by weight of a polyvinyl-aromatic compound and from 99.5 to 80 parts of a monovinyl-aromatic compound and dimethylethanolamine.

5. A process as claimed in claim 3 wherein the anion exchange resin consists of the reaction product of a chloromethylated copolymer of from 0.5 to 20 parts by weight of a polyvinyl-aromatic compound and from 99.5 to 80 parts of a monovinyl-aromatic compound and dimethylisopropanolamine.

6. A method of making sodium hydroxide from calcium hydroxide and sodium chloride by exchange of ions which comprises, passing an aqueous calcium hydroxide solution into contact with a water-insoluble anion exchange agent containing quaternary ammonium chloride groups, said anion exchange agent consisting of the reaction product of a chloromethylated benzene-insoluble copolymer of from 0.5 to 20 parts by weight of a polyvinyl-aromatic compound and from 90.5 to 80 parts of a monovinyl-aromatic compound and a tertiary amine selected from the group consisting of the tertiary mono- and di-alkyl N-substituted alkanolamines, to absorb hydroxyl ions and thereafter treating the anion exchange agent with a stream of an aqueous solution of sodium chloride of at least 10 per cent concentration to effect displacement of the absorbed hydroxyl ions with formation of sodium hydroxide solution containing sodium hydroxide in concentration of at least 5 per cent by weight.

7. A method of making sodium hydroxide from calcium hydroxide and sodium chloride by exchange of ions which comprises, passing an aqueous calcium hydroxide solution into contact with a water-insoluble anion exchange agent containing quaternary ammonium chloride groups, said anion exchange resin consisting of the reaction product of a chloromethylated copolymer of from 0.5 to 20 parts by weight of a polyvinyl-aromatic compound and from 99.5 to 80 parts of a monovinyl-aromatic compound and a tertiary amine selected from the group consisting of the tertiary mono- and di-alkyl N-substituted alkanolamines, to absorb hydroxyl ions, thereafter treating the anion exchange resin with a stream of an at least 15 per cent aqueous sodium chloride solution to effect displacement of the absorbed hydroxyl ions with formation of sodium hydroxide solution and withdrawing the more concentrated mid-portion of the resultant sodium hydroxide solution.

8. A method of making an alkali metal hydroxide from calcium hydroxide and an alkali metal halide by exchange of ions which comprises, passing an aqueous solution of calcium hydroxide through a number of beds of a water-insoluble strongly basic anion exchange resin containing quaternary ammonium halide groups, said anion exchange resin consisting of the reaction product of a vinyl-aromatic resin having halomethyl radicals attached to its aromatic nuclei and a tertiary amine selected from the group consisting of the tertiary mono- and di-alkyl N-substituted alkanolamines, to absorb hydroxyl ions, thereafter passing an at least 15 per cent concentrated aqueous alkali metal halide solution through the bed of anion exchange resin to effect displacement of the absorbed hydroxyl ions with formation of alkali metal hydroxide solution, collecting the effluent liquor flowing from the first bed of anion exchange resin in a series of fractions, withdrawing the more concentrated mid-portion of the resultant alkali metal hydroxide solution, adding solid alkali metal halide to the remaining portions of the alkali metal hydroxide solution to enrich the latter in alkali metal halide and passing the so-treated remaining portions of the alkali metal hydroxide solution successively through the second bed of anion exchange resin to displace hydroxyl ions from the latter with formation of alkali metal hydroxide, thereafter passing sufficient concentrated alkali metal halide solution into said second bed to complete the hydroxyl ion displacement reaction and continuing these operations of withdrawing the more concentrated mid-portion of the alkali metal hydroxide solution as it flows from a bed of anion exchange resin and of enriching a remaining portion of the solution with an alkali metal halide, forwarding it to the next bed of anion exchange resin and then adding to the latter sufficient concentrated alkali metal halide solution to further the displacement of hydroxyl ions therefrom until the solution has been caused to travel in series through the beds and return to the first of said beds as just described, and during these operations again passing calcium hydroxide solution into each bed of the anion exchange resin after the latter has been depleted of hydroxyl ions by passage of the alkali metal halide solution through the same.

9. A process as claimed in claim 8 wherein the anion exchange resin consists of the reaction product of a chloromethylated copolymer of from 0.5 to 20 parts by weight of a polyvinyl-aromatic compound and from 99.5 to 80 parts of a monovinyl-aromatic compound and dimethylethanolamine.

10. A process as claimed in claim 8 wherein the anion exchange resin consists of the reaction product of a chloromethylated copolymer of from 0.5 to 20 parts by weight of a polyvinyl-aromatic compound and from 99.5 to 80 parts of a monovinyl-aromatic compound and methyldiisopropanolamine.

11. A method of making sodium hydroxide from calcium hydroxide and sodium chloride by exchange of ions which comprises, passing an aqueous calcium hydroxide solution through a bed of a water-insoluble anion exchange resin containing quaternary ammonium chloride groups, said anion exchange resin consisting of the reaction product of a vinyl-aromatic resin having halomethyl radicals attached to its aromatic nuclei and a tertiary amine selected from the group consisting of the tertiary mono- and di-alkyl N-substituted alkanolamines, to absorb hydroxyl ions, thereafter passing an at least 15 per cent concentrated aqueous solution of sodium chloride through the bed of anion exchange resin to effect displacement of the absorbed hydroxyl ions with formation of sodium hydroxide solution, collecting the resultant sodium hydroxide solution in a series of fractions as it flows from the bed of anion exchange resin, withdrawing the more concentrated mid-portion of the sodium hydroxide solution, adding solid sodium chloride to the remaining separate portions of the sodium hydroxide solution to enrich the portions in sodium chloride and form a concentrated sodium chloride solution, again passing calcium hydroxide solution through the anion exchange resin after the latter has been depleted of hydroxyl ions by passage of the sodium chloride solution through the same and thereafter passing the enriched separate remaining portions of sodium hydroxide solution from the first cycle of operations through the anion exchange resin in the order in which they were collected, to displace hydroxyl ions from the latter with formation of sodium hydroxide, thereafter passing sufficient saturated sodium chloride solution into said bed of anion exchange resin to complete the hydroxyl ions displacement reaction and continuing the cycle of operations.

12. A method of making an alkali metal hydroxide by exchange of ions which comprises, passing a stream of an aqueous solution of an alkali metal hydroxide into contact with a water-insoluble strongly basic anion exchange resin containing quaternary ammonium chloride groups, said anion exchange resin consisting of the reaction product of a vinyl-aromatic resin having halomethyl radicals attached to its aromatic nuclei and a tertiary amine selected from the group consisting of the tertiary mono- and di-alkyl N-substituted alkanolamines, to absorb hyroxyl ions, thereafter treating the anion exchange resin with a stream of an at least 15 per cent aqueous solution of a halide of a different alkali metal to effect displacement of the absorbed hydroxyl ions with formation of alkali metal hydroxide solution of at least 5 weight per cent concentration.

13. A method of making sodium hydroxide by exchange of ions which comprises, passing a stream of an aqueous solution containing not more than 3 per cent by weight of an alkali metal hydroxide through a bed of a water-insoluble strongly basic anion exchange resin containing quaternary ammonium chloride groups, said anion exchange resin consisting of the reaction product of a vinyl-aromatic resin having halomethyl radicals attached to its aromatic nuclei and a tertiary amine selected from the group consisting of the tertiary mono- and di-alkalyl N-substituted alkanolamines, to absorb hydroxyl ions, thereafter treating the anion exchange resin with a stream of an at least 15 per cent aqueous sodium chloride solution to effect displacement of the absorbed hydroxyl ions with formation of sodium hydroxide solution of at least 5 weight per cent concentration.

WILLIAM C. BAUMAN.

REFERENCES CITED

The following references are of record in the file of this patent:

UNITED STATES PATENTS

| Number | Name | Date |
|---|---|---|
| 1,238,916 | Hoover | Sept. 4, 1917 |
| 2,366,007 | D'Alelio | Dec. 26, 1944 |
| 2,366,008 | D'Alelio | Dec. 26, 1944 |
| 2,409,861 | Hunter | Oct. 22, 1946 |

FOREIGN PATENTS

| Number | Country | Date |
|---|---|---|
| 478,571 | Great Britain | Jan. 17, 1938 |

OTHER REFERENCES

"Organolites Organic Base-Exchange Materials," by Harry Burrell, Ind. & Eng. Chem., vol. 3, No. 3, pp. 358, 361.

"Amberlite IRA-400," Chem. & Eng. News, vol. 26, No. 26, June 28, 1946, pages 1924-1925, and "Amberlite IRA-400," pages 1-3, of Rohm and Haas Co., Wash. Sq., Philadelphia.